United States Patent [19]
Yamawaki et al.

[11] Patent Number: 4,556,165
[45] Date of Patent: Dec. 3, 1985

[54] METHOD OF BRAZING ALUMINUM EMPLOYING FLUOALUMINATE FLUX

[75] Inventors: Satoshi Yamawaki; Atsushi Sugihara; Yasushi Kobayashi; Hiroshi Ishida; Yukio Kuramasu; Ichisei Gotoh, all of Shizuoka, Japan

[73] Assignee: Alcan International Limited, Montreal, Canada

[21] Appl. No.: 622,681

[22] Filed: Jun. 20, 1984

Related U.S. Application Data

[60] Division of Ser. No. 494,372, May 13, 1983, Pat. No. 4,475,960, which is a continuation-in-part of Ser. No. 372,035, Apr. 26, 1982, abandoned.

[30] Foreign Application Priority Data

Mar. 29, 1982 [JP] Japan ................................ 57-49035

[51] Int. Cl.$^4$ ........................................... B23K 35/362
[52] U.S. Cl. ................................ 228/223; 228/263.17
[58] Field of Search .................... 228/223, 224, 263.17

[56] References Cited

U.S. PATENT DOCUMENTS

| 2,854,328 | 9/1958 | Rossborough | 75/53 |
| 3,269,828 | 8/1966 | Hale | 75/53 |
| 3,865,578 | 2/1975 | Takashima | 75/53 |
| 3,892,561 | 7/1975 | Takashima | 75/53 |

FOREIGN PATENT DOCUMENTS 2391803  1/1979  France ................................ 228/223

Primary Examiner—Kenneth J. Ramsey
Attorney, Agent, or Firm—Cooper, Dunham, Clark, Griffin & Moran

[57] ABSTRACT

In the brazing of aluminum a flux composed of a mixture of alkali metal fluoaluminates, with or without admixed $AlF_3$, is employed. The flux has a composition of $AlF_3$ about 53–62%, KF about 35–44%, and LiF about 2–7%, in terms of simple compounds. The flux has a liquidus temperature in the range of 490°–560° C. depending on its actual composition. The flux is of particular utility when brazing aluminum containing 0.4–2% magnesium and/or having a low solidus temperature and is preferably employed in an atmosphere of a dry, inert gas.

10 Claims, No Drawings

METHOD OF BRAZING ALUMINUM EMPLOYING FLUOALUMINATE FLUX

CROSS REFERENCE TO RELATED APPLICATIONS

This application is a division of application Ser. No. 494,372, filed May 13, 1983, now U.S. Pat. No. 4,475,960, which is a continuation-in-part of applicants' copending U.S. patent application Ser. No. 06/372,035, filed Apr. 26, 1982, for "Brazing Flux", now abandoned.

BACKGROUND OF THE INVENTION

This invention relates to a reactive flux useful in joining by brazing surfaces of aluminum and aluminum alloy (hereinafter referred to collectively as "aluminum articles") to one another and to other metal articles, such as copper and stainless steel, for example, and to methods of brazing employing such flux.

Generally, the technique of brazing has been employed in assembling metal articles, consisting wholly or in part of aluminum or aluminum alloys, the parts of which are joined by means of a brazing alloy, which has a lower melting point.

In the construction of automotive parts, for example, the technique of brazing has been employed for the manufacture of structural members such as intake manifolds and cylinder heads as well as heat exchangers for condensers, evaporators, and engine oil coolers. The technique has also been adopted for the manufacture of rectifier heat sinks for use in electronic devices. In various other industrial fields, it has also found widespread acceptance.

When, for example, two aluminum articles are to be joined by means of a brazing alloy, a flux is used to remove any oxide film on the surfaces to be joined. At the same time, the flux improves the wet spreading or flowing property of the molten brazing alloy over the surfaces to be joined. Chloride fluxes have been widely used for that purpose.

Since a chloride flux is soluble in water and hygroscopic, it has a disadvantage that when the flux itself, or the reaction residue resulting from brazing, is permitted to adhere to and remain on the articles being joined, it causes corrosion of the aluminum articles. For this reason, where brazing has been effected with a chloride flux, the brazing operation has had to be followed by a step to remove the residual flux. If some part of the brazed joint being cleaned happens to be inaccessible, there is a possibility that some flux will remain there and eventually lead to corrosion.

It is already known that the corrosion problem arising from the use of chloride fluxes in a brazing operation can be overcome by the use of a flux based on the $AlF_3$-$KF$ binary system which leaves no water-soluble residues.

It is already known from U.S. Pat. No. 3,951,328 to employ fluxes of that type which are free from water-soluble components; particularly fluxes which are free from unreacted KF. Such fluxes can be employed in the form of an aqueous slurry, which is dried off before the commencement of the brazing operation. Since the brazing operation is very advantageously carried out in a very dry atmosphere, particularly a very dry nitrogen atmosphere, it is extremely desirable that the applied flux should be free of hygroscopic components, such as unreacted KF.

The flux specifically described in U.S. Pat. No. 3,951,328 consists of a mixture of potassium fluoaluminates, which may be formed separately and mixed or be formed in intimate mixture by a separately performed chemical reaction.

It was stated in U.S. Pat. No. 3,951,328 that the flux could include up to about 5 mole % total of LiF, $CaF_2$, NaF, but such addition was stated to result in an increase in the liquidus temperature ("melting point") of the flux and it was therefore concluded that such addition of alkali metal fluoride or alkaline earth metal fluoride was not advantageous.

The lowest liquidus temperature of the straight potassium fluoaluminate flux of U.S. Pat. No. 3,951,328 is about 560° C. (substantially higher than that of the chloride-type fluxes already mentioned). Such a liquidus temperature is considered too high for use in brazing operations where one of the components has a relatively low solidus temperature, for example where it is formed from an Al casting, having a high Si content. Generally, it is considered desirable in a brazing operation, in order to achieve a stable product quality and a reliable brazing operation, that, on the one hand, the melting point (liquidus) of the brazing alloy should be 10° to 40° C. lower than the solidus temperature of the articles to be joined, while on the other hand, the melting point (liquidus) of the flux should be equal to or up to 20° C. lower than the solidus temperature of the brazing metal. From this point of view, any reduction in the melting point of the flux itself can be expected to expand the range of aluminum alloys which can be joined by brazing and, as a consequence, widen the range of useful products that can be assembled in this manner.

Further in the case of the known potassium fluoaluminate flux, if this flux is used for brazing aluminum articles containing magnesium, the wet spreading or flowing property exhibited by the brazing metal on such aluminum articles suffers and the brazing operation itself may be impaired so much as to render achievement of the desired joint strength impracticable. From a practical point of view, therefore, this flux has been considered applicable to the brazing of aluminum alloys having a magnesium (Mg) content of no more than 0.4% (by weight).

In U.S. Pat. No. 3,951,328, the relative content of the potassium fluoaluminate in terms of $AlF_3$ and KF were stated to be (by weight) $AlF_3$ 65–45% and KF 35–55% with a preferred composition of about $AlF_3$ 54.2% and KF 45.8%.

SUMMARY OF THE INVENTION

According to the present invention, it has been discovered that within a more closely controlled range of proportions of $AlF_3$ and KF, the introduction of LiF into the fluoaluminate in an amount somewhat larger than described in U.S. Pat. No. 3,951,328 results in a substantial reduction of the flux melting point (liquidus).

According to the present invention, there is provided a flux, which comprises, as expressed in terms of simple compounds, 53.0 to 62.0 wt % of aluminum fluoride ($AlF_3$), 35.0 to 44.0 wt % of potassium fluoride (KF), and 2.0 to 7.0 wt % of lithium fluoride (LiF), said compounds existing in the flux in the form of a mixture of fluoaluminate complexes or mixture thereof with aluminum fluoride. The LiF content of the flux corresponds to about 5–17.5 mole % of the flux.

Flux having a composition in the range defined above has a melting point which can vary over the range of approximately 490° to 560° C., depending on the flux composition. It has been found capable of brazing aluminum articles having an Mg content of up to 2 wt %. In the course of brazing, this flux produces very little insoluble residue and forms a brazed joint of highly desirable qualities.

The system KF, AlF$_3$, LiF has a eutectic composition of about (by weight %) 43 KF, 54.7 AlF$_3$, 2.3 LiF and with a melting point of about 490° C. The liquidus temperature rises steeply in this compositional region, and when a flux of exceptionally low liquidus temperature is required, the fluoaluminate flux composition is controlled to be very close to the above-stated eutectic.

The contents of AlF$_3$ and KF should not deviate appreciably from their respective lower and upper limits. For, when they depart from the stated ranges, the resultant flux produces during brazing a white insoluble residue, which impairs further union by brazing, and the melting point of the flux increases above the desired range.

The content of LiF should not fall short of about 2.0 wt %. When it is less than this level, the flux in use, depending on the proportions of AlF$_3$ and KF present, produces a white insoluble material and fails to manifest the desired brazing property with aluminum alloys containing magnesium. The LiF content should not, on the other hand, exceed about 7.0 wt %. Above this level, the flux produces in use a black insoluble material and consequently impairs further union by brazing and the melting point of the flux itself is elevated.

In the flux of this invention, the components thereof are required to be present in the form of a mixture of fluoaluminate complexes as such or such complexes in admixture with aluminum fluoride. As distinct forms of such fluoaluminate complexes, such structures as KAlF$_4$, K$_3$AlF$_6$, K$_2$LiAlF$_6$, LiAlF$_4$, and Li$_3$AlF$_6$ have been identified. Depending on the method to be used for the preparation of the present fluxes, compounds such as K$_2$AlF$_5$.H$_2$O which are less stable than the aforementioned complex salts may possibly be produced in trace quantities. The presence of trace amounts of such compounds is essentially immaterial, because they are converted into the aforementioned complex salts when the temperature is elevated during the brazing operation.

In the flux of the present invention, the fluorides are fundamentally desired to be present in the form of fluoaluminate complex salts, because the fluoaluminate complexes have better effects upon the homogeneity and stability of the flux and the reliability of its melting point, for example.

A flux prepared by simply blending simple fluoride compounds would be subject to various problems such as separation of its components during storage due to differences in specific gravity, the effects of different diffusion speeds of the fused compounds during brazing upon the reliability of the flux in terms of homogeneity and melting point, and the creation of a defective joint due to the occurrence of insoluble residues resulting from variations in composition. Thus, a flux prepared in that manner would not be suitable in practice for the purpose of brazing operations.

Further features and advantages of the invention will be apparent from the detailed description hereinbelow set forth.

DETAILED DESCRIPTION

In the embodiments now to be described, the present invention contemplates the provision of a brazing flux consisting essentially of a mixture of alkali metal fluoaluminates, with or without admixed AlF$_3$, the mixture comprising, in terms of simple compounds,
aluminum fluoride about 53–62%;
potassium fluoride about 35–44%;
lithium fluoride about 2–7%; and
impurities up to 2%;
all percentages being by weight.

Fluoaluminate complexes can be produced by the so-called fusion process or by the wet process. One fusion process produces fluoaluminate complexes by fusing the mixture of simple fluoride compounds having aforementioned compositions or their complexes and converting the resultant mixture into a fused coagulation. Fluoaluminate complexes may be formed in other fusion processes; for example, a suitable potassium fluoaluminate complex may be formed as a by-product in the manufacture of titanium diboride and further processed to a flux of the invention by addition of LiF, followed by further fusion. The wet process produces fluoaluminate complexes by dissolving hydroxides of the metallic components of the flux (Al(OH)$_3$, KOH, and LiOH) in an aqueous hydrofluoric acid solution, allowing the hydroxides to react with one another and with the acid to form fluoaluminates and drying the resultant complexes.

The fluxes of the present invention can be manufactured according to a desired composition by a one-step method which is based on the fusion process or the wet process. Alternatively, they may be manufactured by a more complicated method which comprises preparing individual fluoaluminate complexes in separate steps, homogeneously mixing these fluoaluminates in amounts calculated to give a desired fluoride composition of this invention, converting the resultant mixture into an aqueous slurry, and again drying the slurry. Other similar methods can also be employed, as the method of manufacture is not critical.

While fluxes of this invention can be manufactured by any of the various methods described above, it is desirable to control the purity of the raw materials to be used and adjust the manufacturing conditions so that the inevitably entrained impurities in the ultimate flux do not exceed the approximate level of 2 wt %. The particle diameter of the flux powder is desired to be as small as possible. Normally, it is appropriate to keep this particle diameter below 74 microns.

The fluxes of this invention have melting points lower than the melting point of conventional AlF$_3$-KF-type fluxes. They promote an advantageous wet spreading or flowing action of the brazing metal on magnesium-containing aluminum alloys because of their specific percentage composition and their specific form described below. The present fluxes are, therefore, useful in an expanded range of applications for brazable aluminum materials.

By means of the flux of the present invention, virtually all aluminum alloy products, whether prefabricated or cast, except Al-Cu-type alloys (AA2XXX alloys), Al-Mg alloys containing more than about 2 wt % of Mg, and Al alloys having a melting temperature of below about 530° C., can be brazed independently of their manufacturing steps. The flux can be applied not only to the brazing of two aluminum articles but also the brazing of an aluminum article to a copper, a stainless steel or other metal article.

Brazing with the flux of the present invention can be effected in ways similar to those used in brazing operations with the conventional potassium fluoaluminate-type flux. Before brazing, the surfaces to be joined are subjected to known preliminary treatments, such as degreasing and roughening or abrading. Then, the flux is applied to the surfaces by any suitable method, which includes depositing the flux in its original powdered form on the surfaces being joined; mixing the powdered flux with a liquid medium, such as water, which is incapable of forming a residue during the brazing operation, to make a slurry (containing 5 to 60 dry wt % of flux, preferably 5–50 dry weight % of solid flux material and 95–50 weight % of a fluid medium), applying this slurry to the surfaces by any suitable technique (brushing, spraying, showering, or immersing), and thereafter drying the applied slurry; or mixing the brazing alloy in powdered form with the flux and subjecting the resultant mixture to the same steps as in any of the preceding methods. The brazing alloy is introduced into the joint in any conventional manner, for example as a coating on one of the components. The flux is introduced in an amount appropriate to the brazing operation and the conditions under which it is to be performed. In most instances the flux is applied in an amount of 3–15 g/m$^2$. However, in some instances, amounts above or even somewhat below this range may be usefully employed.

The brazing alloy with which the flux of the present invention is advantageously used is an aluminum alloy having a liquidus temperature in the neighborhood of 510° to 570° C. Examples of preferred alloys include the Al-5% Si-26% Cu-type alloy (liquidus temperature 517° to 530° C.) as well as AA4043, AA4045, AA4047, AA4145, AA4245, AA4343, and AA4543. Such an alloy can be used in a suitable form such as, for example, powder or granules, a wire or rod, a plate, a punched plate, or a layer clad on a core, with the selection thereof made in due consideration of the contour of the surfaces to be joined and the ease of brazing work to be involved.

Then, the articles whose joining surfaces have already received the brazing metal thereon are held fast with a suitable jig in a prescribed relative position. Conveniently, the materials are held at a brazing temperature of 530°–580° C., depending upon the melting point of the brazing alloy and the solidus temperature of the material to be joined, for 3 to 20 minutes while surrounded by an atmosphere of inert gas such as nitrogen gas, preferably kept dry by control of the moisture content below the level of about 250 ppm.

For the brazing operation, proper brazing equipment and devices suitable for the particular shape of article to be joined and the desired productivity can be adopted. Generally, a torch brazing unit, a high-frequency brazing unit, and a furnace brazing unit (either for batchwise or continuous operation) are available.

The fluxes of the present invention when used in the brazing operation described above have been demonstrated to be equivalent or superior to conventional potassium fluoaluminate-type fluxes in all areas of evaluation such as their ability to remove the oxide coating on the joining surfaces, ability to promote wet spreading or flowing of the brazing alloy on aluminum surfaces, ability to inhibit formation of residues during the brazing, and ability to effectively mechanically join the surfaces to be brazed. Since the flux of this invention has a lower melting point than the conventional flux, it expands the range of aluminum products that can be effectively brazed. Particularly, magnesium-containing aluminum alloy articles are rendered brazable to some extent by the flux of this invention. Since the flux residue after brazing is composed of water-in-soluble fluoaluminate complexes, there is no necessity for removing any residual flux from the joint region, such as by a cleaning treatment. The brazing procedure using the flux of this invention is simple in nature and is free from the tendency toward corrosion of the brazed product, as compared with brazing with the conventional chloride flux, both of which advantages are quite important from the practical point of view.

Now, to illustrate the manner of use of the flux of this invention, typical cases in which the flux of this invention was prepared and used in the brazing of fabricated articles and cast articles will be described below as working examples.

EXAMPLE 1

$K_3AlF_6$, $AlF_3$, and $Li_3AlF_6$ were used as raw materials. They were mixed in the proportions of 57.7 parts by weight of $K_3AlF_6$, 32.4 parts by weight of $AlF_3$, and 9.9 parts by weight of $Li_3AlF_6$, fused, and solidified. The resultant solid was crushed to produce a powdered flux.

This powdered flux had a melting point of 558° C. When it was analyzed by X-ray diffraction, the presence of $K_3AlF_6$, and $KAlF_4$, and $Li_3AlF_6$ was confirmed. In terms of chemical composition, the powdered flux was found by chemical analysis to consist of 56.3 wt % of $AlF_3$, 39.0 wt % of KF, and 4.7 wt % of LiF.

This powdered flux was mixed with water to prepare an aqueous slurry having a solids content of 10 dry wt %. The aqueous slurry was spray-applied to a flat tube of AA1050 alloy degreased in advance with trichloroethylene, and then dried at 150° C. for five minutes. Subsequently, a corrugated fin member of an Al-10%Si-4%Cu (equivalent to AA4145 alloy) alloy, clad on the opposite surfaces of a core of AA3003, was integrally combined with the flat tube mentioned above. Within a conveyor-type continuous brazing furnace, the combination of both articles was held at 570° C. for five minutes in an atmosphere of nitrogen gas. Consequently, both articles were connected to form a plurality of automotive condensers.

The condensers thus produced were tested for quality. The ratio of adhesion between the corrugated fin and the flat tube was 98% or over on the average and the pressure resistance was 100 to 150 kg/cm$^2$. They were further subjected to an accelerated corrosion test in a brine spray. Even after 1,000 hours of such exposure, occurrence of harmful holes of corrosion was not observed. They showed ample brazing strength to prove the outstanding brazing property of the flux of this invention. Further, the flux produced no apparent adverse effect upon corrosion resistance of the product. Thus, the flux was shown to satisfy all the properties expected of a flux.

EXAMPLE 2

A flux consisting of 59.3 wt % of $AlF_3$, 37.6 wt % of KF, and 3.1 wt % of LiF was prepared by the wet method which comprised mixing the starting materials in the form of hydroxides in an aqueous hydrofluoric acid solution and causing the components of the mix to react to form insoluble fluoaluminates. The produced flux was found to have a melting point of 550° C. When this flux was analyzed by X-ray diffraction, the presence of $KAlF_4$, $K_3AlF_6$, and $Li_3AlF_6$ was confirmed.

This flux was mixed with water to produce an aqueous slurry having a flux content of 50 dry wt %. This aqueous slurry was applied with a brush to the surfaces of the two halves of several die-cast intake manifolds of Al-12% Si-0.8% Mg alloy which were to be joined, after such surfaces were roughened with a wire brush. The applied slurry was dried at 200° C. for five minutes.

Subsequently, a brazing metal prepared by punching a plate of Al-10% Si-4% Cu-10% Zn alloy (equivalent to AA4245 alloy) in the shape conforming to the joint surfaces was mounted on one of those surfaces and the manifold halves were fitted together. The manifold assembly with the brazing material interposed between the joint surfaces thereof was placed in a batch-type brazing furnace filled with an atmosphere of nitrogen gas and heated at 560° C. for 10 minutes to effect brazing.

The intake manifold thus obtained was tested for quality. In an airtightness test, no leakage was detected under an inner pressure of 2.0 kg/cm². The pressure resistance was found to be in the range of 60 to 100 kg/cm². In an accelerated corrosion test with brine spray, no occurrence of holes due to corrosion was observed after 1,000 hours of exposure. The flux was thus shown to satisfy all the properties expected of a flux.

As an alternative in the above method, the flux may be applied to the opposed face of the brazing alloy sheet in place of or in addition to applying the flux to the face of the cast manifold half.

This example shows two advantages of the employment of the flux:
(i) the brazing of an aluminum alloy component having an Mg content higher than that which would conveniently permit brazing by the use of a potassium fluoaluminate flux free of lithium fluoaluminate phases; and
(ii) brazing an aluminum alloy which has a solidus temperature too low to permit it to be brazed conveniently by use of a conventional potassium fluoaluminate flux.

It is to be understood that the invention is not limited to the features and embodiments hereinabove specifically set forth, but may be carried out in other ways without departure from its spirit.

We claim:

1. A method of producing a brazed joint between an aluminum or aluminum alloy component and another metallic component which comprises interposing between said components a body of a brazing alloy having a lower liquidus temperature than the solidus temperature of said components and a body of a flux consisting essentially of a mixture of fluoaluminate complexes containing Al, F, K, and Li atoms in said mixture, or a mixture of such complexes with aluminum fluoride, said flux having the Al, F, K, and Li atoms thereof present in amounts corresponding to the following proportions of the simple compounds:
aluminum fluoride about 53–62%
potassium fluoride about 35–44%
lithium fluoride about 2–7%
said flux containing up to about 2% entrained impurities, all percentages being by weight; and heating said assemblage to a temperature above the liquidus temperature of said brazing alloy and below the solidus temperature(s) of said components.

2. A method according to claim 1 wherein at least one of said components is an Al alloy containing Mg in an amount of 0.4–2% by weight.

3. A method according to claim 1 wherein the flux is applied in the form of an aqueous slurry in an amount of 3–15 gms/m² of solids.

4. A method according to claim 1 wherein the components are aluminum alloy castings and the brazing alloy is introduced as a preformed sheet member between the faces to be joined.

5. A method according to claim 1 wherein the assemblage is heated in an inert gas atmosphere having a water vapor content below 250 p.p.m.

6. A method according to claim 1, wherein said flux is a fused mixture of fluoride compounds containing Al, F, K, and Li atoms.

7. A method according to claim 1, wherein said flux is produced by reacting hydroxides of Al, K, and Li with hydroflouric acid in aqueous solution.

8. A method according to claim 1, wherein said flux comprises a homogeneous mixture of separately prepared fluoaluminate fluxes of which at least one is a ternary compound of Li, Al, and F.

9. A method according to claim 8, wherein said ternary compound is $Li_3AlF_6$.

10. A method according to claim 1, wherein at least one of said complexes is a ternary compound of Li, Al, and F.

* * * * *